(12) United States Patent
Smith et al.

(10) Patent No.: US 12,470,631 B1
(45) Date of Patent: Nov. 11, 2025

(54) MULTI-USER CONTENT SHARING USING ANCHORS IN 3D ENVIRONMENTS

(71) Applicant: Apple Inc., Cupertino, CA (US)

(72) Inventors: Connor A. Smith, San Mateo, CA (US); Joanne Lee, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/127,270

(22) Filed: Mar. 28, 2023

Related U.S. Application Data

(60) Provisional application No. 63/325,250, filed on Mar. 30, 2022.

(51) Int. Cl.
*G06F 15/16* (2006.01)
*H04L 67/141* (2022.01)
*H04L 67/52* (2022.01)

(52) U.S. Cl.
CPC ............ *H04L 67/141* (2013.01); *H04L 67/52* (2022.05)

(58) Field of Classification Search
CPC .............................. H04L 67/52; H04L 67/141
See application file for complete search history.

(56) References Cited

U.S. PATENT DOCUMENTS

| | | | |
|---|---|---|---|
| 2013/0044128 A1* | 2/2013 | Liu ...................... | G02B 27/017 345/633 |
| 2018/0321894 A1* | 11/2018 | Paulovich ............. | G06F 3/1454 |
| 2019/0313059 A1* | 10/2019 | Agarawala ........... | G06T 19/006 |
| 2022/0254119 A1* | 8/2022 | Berliner ................ | G06F 3/147 |

OTHER PUBLICATIONS

"Infinite Office" YouTube video presentation screenshots, 4 pages, 2021 https://www.youtube.com/watch?v=5_bVkbG1ZCo.
"Horizon Workrooms" YouTube video presentation screenshots, 5 pages, 2021 https://www.youtube.com/watch?v=lgj50lxRrKQ&t=44.
VRScout, "How to Use Horizon Workrooms on Oculus Quest 2," YouTube video presentation screenshots, 6 pages, 2021 https://www.youtube.com/watch?v=018SIWhRMkg.
Krisp, "Supercharge your online meetings with Voice Productivity AI," YouTube video presentation screenshots, 3 pages, 2021 https://krisp.ai/?exp_demo=1.

(Continued)

*Primary Examiner* — Normin Abedin
(74) *Attorney, Agent, or Firm* — Thompson Hine LLP

(57) ABSTRACT

Various implementations provide advantages of real-world environments, such as real-world office spaces in which workers have desks or office spaces located within the same floor, hallway, common area, etc., in remote circumstances. Communications sessions between the devices of remote users share content amongst the users. This may involve sharing audio content so that the users can talk to one another or hear the real or virtual sounds from one another's areas (e.g., offices). This may involve sharing visual content of the users, their avatars, or real or virtual objects so that the users can see one another and objects within one another's areas. Some implementations determine to initiate or continue sharing content based on one more criterion. A communication session between users or the sharing of content within a communication session may be initiated or continued based on a spatial relationship amongst anchors of users within a common coordinate system.

22 Claims, 5 Drawing Sheets

(56) References Cited

OTHER PUBLICATIONS

"Infinite Office" YouTube video presentation, 4 pages, 2021, https://www.youtube.com/watch?v=5_bVkbG1ZCo (video is on the CD filed herewith).

"Horizon Workrooms" YouTube video presentation screenshots, 5 pages, 2021 https://www.youtube.com/watch?v=lqj50lxRrKQ&t=44 (video is on the CD filed herewith).

VRScout, "How to Use Horizon Workrooms on Oculus Quest 2," YouTube video presentation screenshots, 6 pages, 2021, https://www.youtube.com/watch?v=018SIWhRMkg (video is on the CD filed herewith).

Krisp, "Supercharge your online meetings with Voice Productivity AI," YouTube video presentation screenshots, 3 pages, 2021, https://krisp.ai/?exp_demo=1 (video is on the CD filed herewith).

\* cited by examiner

MULTI-USER CONTENT SHARING USING ANCHORS IN 3D ENVIRONMENTS

CROSS-REFERENCE TO RELATED APPLICATIONS

This Application claims the benefit of U.S. Provisional Application Ser. No. 63/325,250 filed Mar. 30, 2022, which is incorporated herein in its entirety.

TECHNICAL FIELD

The present disclosure generally relates to electronic devices that provide views of 3D environments that include content that may be at least partially shared amongst multiple users, including views in which the sharing of content via a communication session is initiated or continues based on a criterion being satisfied.

BACKGROUND

In real-world environments, such as real-world spaces in which people have furnishing or spaces that are located within the same floor, hallway, common area, building, etc., various natural person-to-person interactions occur amongst those people due to their proximity to one another. In the real-world environments, given their proximity to one another, people engage in spontaneous interactions and interact with one another at various times throughout the day because their proximity and activities naturally lead to such interactions.

Similarly, in many workplace and educational environments, natural interactions result due to the closeness of people's desks, cubicles, or office spaces to one another. For example, the office spaces of some workers may be sufficiently close to one another such that the workers can initiate and conduct conversations with one another without leaving their work areas, e.g., simply by calling another worker's name or speaking at a relatively high volume. In another example, a person may lean over in their chair to see and discuss the content that is displayed on another person's desktop, e.g., in a cubicle adjacent to the person's own cubicle. Teams may work together in common open areas in which each team member has their own workspace located within a common area, such that talking and other sounds produced within the respective workspaces can be overheard by others on the team in their own workspaces and objects within each person's workspace can be seen or shown to others on the team in their own workspaces. In another example, a person may overhear a conversation of others who are nearby and decide to join in. In another example, a person may simply walk to the office next to their own office to ask a quick question of the neighbor in that next office. In another example, one person may pass another in a hallway or in a common area and spontaneously decide to initiate a conversation there. Interactions in such real environments may be spontaneous, serendipitous, collaborative, involve less planning/initiation/acceptance user effort or otherwise have desirable attributes that are lacking in remote circumstances in which people interact with one another, e.g., via separate home offices via pre-planned or otherwise intentionally-initiated and manually joined voice and video calls.

SUMMARY

Various implementations disclosed herein include devices, systems, and methods that provide, in remote circumstances, one or more of the advantages of in-person real-world environments, such as real-world office spaces in which workers have desks or office spaces that are located within the same floor, hallway, common area, etc. Communication sessions between the devices of remote users enable the sharing of content amongst the users. This may involve sharing audio content so that the users can talk to one another or hear the real or virtual sounds from one another's areas (e.g., offices). This may involve sharing visual content of the users, their avatars, or real or virtual objects so that the users can see one another or objects within one another's areas. Some implementations determine to initiate or continue sharing content based on one more criterion being satisfied, so that the sharing and associated user interactions may be spontaneous, serendipitous, collaborative, and/or otherwise have desirable attributes that may be otherwise lacking in remote circumstances.

In some implementations, a communication session between users or the sharing of content within a communication session is initiated or continued based on a relationship amongst anchors of the users within a common coordinate system, e.g., two users' virtual desks being within a threshold distance of one another in a virtual office space, the users' offices being associated with a same team or other cluster, or one user's avatar entering another user's work space within a virtual office complex. The initiation and continuation of content sharing amongst users should be performed according to each user's preferences such that each user's privacy is respected and to ensure that private information is not unintentionally shared amongst users.

In some implementations a processor performs a method by executing instructions stored on a computer readable medium. The method determines a relationship between a first anchor associated with a first user operating a first device and a second anchor associated with a second user operating a second device. In some implementations, at least one of the first anchor or the second anchor corresponds to an area or furnishing within the coordinate system. As non-limiting examples, the first and second anchors may correspond to the first and second users, the real desks of the users, real areas associated with each of the users, virtual avatars of the users, virtual desks of the users, or virtual areas assigned to the users. The first anchor and second anchor may be positioned within a common coordinate system, e.g., located adjacent to one another within a single, three-dimensional (3D) real-world or extended reality (XR) environment. In one example, the relationship between the anchors is the distance or other proximity metric between a user and the desk of another user in a real-world physical environment. In another example, the relationship between the anchors is the distance or other proximity metric between a user's avatar and the desk of another user in an XR environment. In another example, the relationship between the anchors is whether a user's avatar is within an area (e.g., a virtual office space) of another user in an XR environment. In another example, the relationship between the anchors is whether the anchors (e.g., desks, office chairs, tables, etc.) are within a threshold distance of one another. In another example, the relationship between the anchors is whether the anchors are part of the same defined cluster.

The exemplary method determines that the relationship between the first anchor and the second anchor satisfies a criterion. The criterion may provide, for example, a spatial or clustering requirement. Such a requirement may that a position of at least one of the first anchor or the second anchor to correspond to an area (e.g., an office space) or furnishing (e.g., desk) within the coordinate system. In one example, the criterion requires that the distance between a user or the user's avatar and another user's desk be less than a threshold. In another example, the criterion requires that desks of both users be associated with the same cluster. In another example, the criterion requires that the users' virtual office spaces be spaces that are within a threshold distance of one another. In another example, the criterion requires that an office space be within a line of site of an avatar's current position.

The exemplary method shares content via a communication session between the first device and the second device based on the relationship satisfying the criterion. For example, based on the first user or their avatar being close enough to the second user's desk, the method may automatically initiate or continue a communication session in which there is (a) sharing of virtual content defined for the second user's virtual desk/white board with the first user or (b) sharing of audio captured on a microphone or video captured by the devices of the first user or second user. In other examples, the relationship satisfying the criterion may be used to (a) determine whether content is shared, (b) identify what content is shared, or (c) configure sharing attributes, e.g., increasing volume as anchors move closer to one another. The content sharing may be further based on (a) user information, e.g., how loud a user is speaking or (b) user settings/restrictions, e.g., whether a user has specified a focus mode or do not disturb mode, provided restrictions on sharing certain private content items, restrictions to share only certain content items, or restrictions to share some content items only based on manual confirmation due to the private nature of the items, etc.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
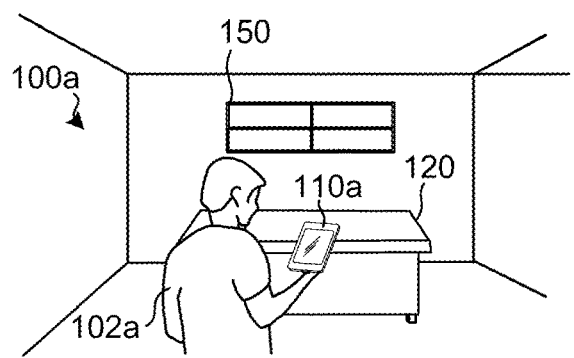
FIGS. 1A and 1B illustrate exemplary electronic devices operating in different physical environments in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
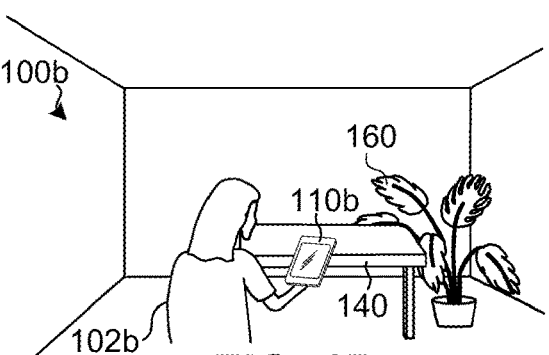

FIGS. 1A and 1B illustrate exemplary electronic devices 110a, 110b operating in different physical environments 100a, 100b. Such environments may be remote from one another, e.g., not located within the same room, building, complex, town, etc. In FIG. 1A, the physical environment 100a is a room that includes a first user 102a, the first user's desk 120, and a window 150. In FIG. 1B, the physical environment 100b is a different room that includes a second user 102b, the second user's desk 140, and a plant 160. The electronic devices 110a-b may each include one or more cameras, microphones, depth sensors, or other sensors that can be used to capture information about and evaluate their respective physical environments 100a-b and the objects within those environments 100a-b, as well as information about the users 102a-b, respectively. Each device 110a-b may use information about its respective physical environment 100a-b and/or user 102a-b that it obtains from its sensors to provide visual and audio content and/or to share content during a communication session.

Figure 2A:
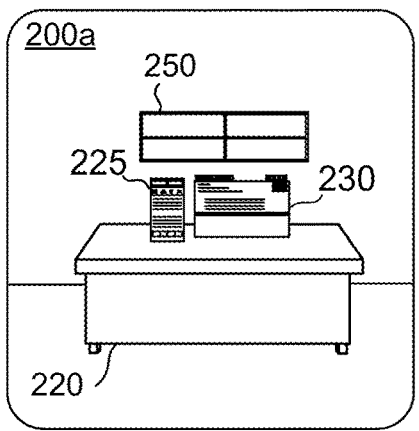
FIGS. 2A and 2B illustrate exemplary views provided by the electronic devices of FIGS. 1a and 1b, respectively, in accordance with some implementations.
Figure 2B:
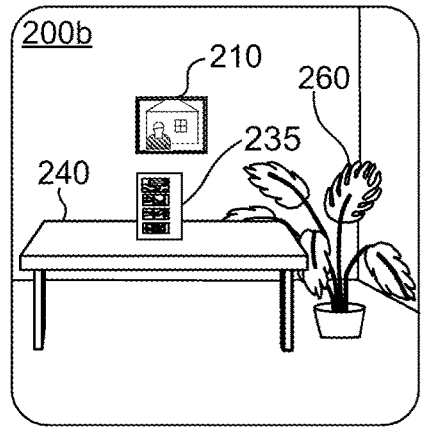

FIGS. 2A and 2B illustrate the exemplary electronic devices 110a-b of FIGS. 1A and 1B providing views 200a-b to their respective users 102a-b. FIG. 2A illustrates a view 200a provided by device 102a that depicts an extended reality (XR) environment, including a depiction 220 of the first user's desk 120 and a depiction 250 of the window 150. The view 200a additionally includes virtual content items, in this example corresponding to virtual user interfaces 225, 230, displaying application content (e.g., web browser content, document content, spreadsheet content, etc.) that the user 102a can interact with to complete work tasks or engage in other activities. In this example, the view 200a is a view of an extended reality (XR) environment that depicts a combination of real and virtual items and that enables user interactions with those items.

Similarly, FIG. 2B illustrates a view 200*b* provided by device 102*b* that depicts an extended reality (XR) environment, including a depiction 240 of the second user's desk 140 and a depiction 260 of the plant 160. The view 200*b* additionally includes virtual content items, in this example corresponding to a virtual wall decoration 210 and a virtual user interface 235 that displays application content with which the user 102*b* can interact. Accordingly, in this example, the view 200*b* is also view of an extended reality (XR) environment that depicts a combination of real and virtual items and that enables user interactions with those items.

In one exemplary use case, the users 102*a-b* utilize devices 110*a-b* to independently experience the XR environments depicted in FIGS. 2A and 2B. In other use cases, the users 102*a-b* use devices 110*a-b* to experience views in which there is at least some shared content, e.g., during a communication session in which at least some audio or visual content is shared between the devices 110*a-b* and used to enhance or alter the experience of the users 102*a-b*.

Figure 3:
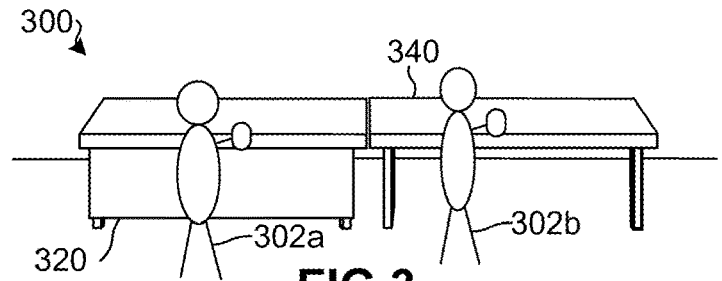
FIG. 3 illustrates positioning of anchors within a single coordinate system according to some implementations.

Some implementations utilize anchors associated with the users to facilitate such sharing of content. The initiation or continuation of such sharing may be based on relationships of anchors associated with each user within a same coordinate system. For example, as illustrated in FIG. 3, one or more anchors associated with each of the users 102*a-b* may be positioned within a 3D environment 300. A first anchor associated with the first user 102*a* is a representation 320 of the first user's desk 120 that is positioned within 3D environment 300. A second anchor associated with the first user 102*a* is a representation 302*a* of the first user 102*a* that is positioned within the 3D environment 300. A first anchor associated with the second user 102*b* is a representation 340 of the second user's desk 140 that is positioned within 3D environment 300. A second anchor associated with the second user 102*b* is a representation 302*b* of the second user 102*b* that is also positioned within the 3D environment 300. In this example, each of the users 102*a-b* is associated with two anchors, respectively. In other examples, any number of zero or more anchors may be associated with an individual user within a shared 3D coordinate system 300. Moreover, anchors may be static (e.g., defined office areas), relatively static (e.g., desks that are rarely moved), or non-static (e.g., avatars of users that move within the coordinate system based on user movements or input). As will be discussed with respect to FIGS. 5A-C and FIGS. 6A-C, relationships amongst the anchors in the same 3D environment may be used to make determinations about sharing content amongst users.

Figure 4A:
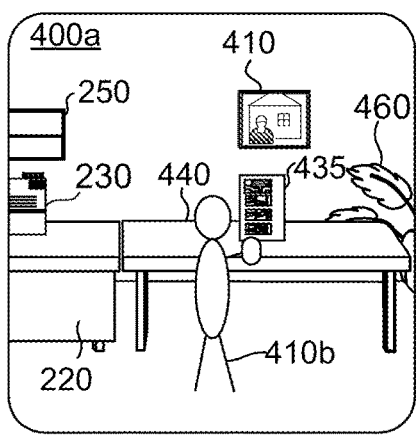
FIGS. 4A and 4B illustrate exemplary views provided by the electronic devices of FIGS. 1a and 1b and including shared content, in accordance with some implementations.
Figure 4B:
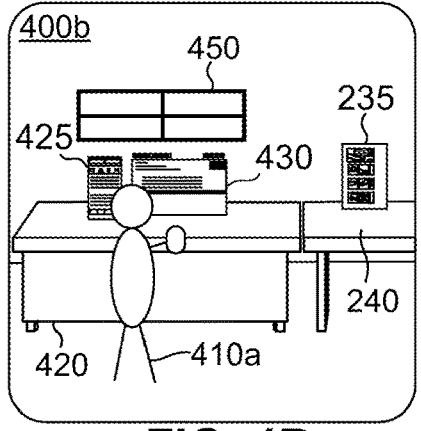

FIGS. 4A and 4B illustrate the exemplary electronic devices 110*a-b* of FIGS. 1A and 1B providing views 400*a-b* to their respective users 102*a-b*. In this example, each of the devices provides a respective view of the same shared XR environment, which is based on the 3D environment 300 of FIG. 3, i.e., the same environment that is used to define anchor positions is also used to present the shared XR experience in this example. In this example, the shared XR environment is a combination of the XR environments depicted in views 200*a-b* of FIGS. 2A-B and is based on the positional relationships of the depictions 220, 240 of the users' desks in the 3D environment of FIG. 3.

In FIG. 4A, view 400*a* is similar to view 200*a*, including depictions 220, 230, 250, but additionally includes depictions of content shared by the second device 110*b*, including depiction 440 of the desk 140, depiction 460 of the plant 160, virtual content 410 (based on virtual content 210) and virtual content 435 (based on virtual content 235). The virtual content may be shared in various ways, e.g., sharing images, 3D models, or other forms of data representing a virtual object's appearance, sounds, or other attributes within an extended reality (XR) environment. During a live communication session, data representing shared content may be shared over time, e.g., as frames or other sets of data associated with particular times. Virtual content positioning may be based on a positional linking or joining of two or more users' separate XR environments, e.g., positioning some or all the items of one user's XR environment adjacent to another user's XR environment based on a defined positioning of anchors of the users, e.g., based on the users having desk anchors that are positioned adjacent to one another in a defined 3D environment, e.g., as depiction 320 of desk 120 and depiction 340 of desk 140 are positioned adjacent to one another in FIG. 3. Accordingly, in addition to being able to be used to determine if, when, and how to initiate and continue the sharing of content amongst users, such anchors may additionally or alternatively be used to define positional relationships of objects when such sharing occurs, e.g., to produce a combined XR environment with real and/or virtual objects that are shared by and to one or more users.

In addition, the view 400*a* includes a depiction 410*b* (e.g., a realistic or non-realistic avatar) of the user 102*b*. The depiction 410*b* of the user 102*b* may be based on information shared from device 110*b*, e.g., based on a stream of live images or other data corresponding to at least a portion of the user 102*b* that device 110*b* sends to device 110*a* during a communication session, or on information on device 110*a*, e.g., based on a previously-obtained user representation of user 102*b*. As the user 102*b* moves around, makes hand gestures, and makes facial expression, corresponding movements, gestures, and expressions may be displayed for the depiction 410*b* in the view 400*a*. For example, as the user 102*b* moves left two feet in physical environment 100*b*, the view 400*a* may show the depiction 410*b* moving left two feet in the view 400*a* corresponding to shared XR environment. Audio, including but not limited to words spoken by user 102*b*, may also be shared from device 110*b* to device 110*a* and presented as an audio component of view 400*a*.

In FIG. 4B, view 400*b* is similar to view 200*b*, including depictions 235, 240, but additionally includes depictions of content shared by the first device 110*a*, including depiction 420 of the desk 120, depiction 450 of the window 150, virtual content 425 (based on virtual content 225) and virtual content 430 (based virtual content 230). The content may be shared in various ways as discussed above with respect to FIG. 4A.

In addition, in FIG. 4B, the view 400*b* includes a depiction 410*a* (e.g., a realistic or non-realistic avatar) of the user 102*a*. The depiction 410*a* of the user 102*a* may be based on information shared from device 110*a*, e.g., based on a stream of live images or other data corresponding to at least a portion of the user 102*a* that device 110*a* sends to device 110*b* during a communication session, or on information on device 110*b*, e.g., based on a previously-obtained user representation of user 102*a*. As the user 102*a* moves around, makes hand gestures, and makes facial expression, corresponding movements, gestures, and expressions may be displayed for the depiction 410*a* in the view 400*b*. Audio, including but not limited to, words spoken by user 102*a*, may also be shared from device 110*a* to device 110*b* and presented as an audio component of view 400*b*.

The depictions 410*a-b* of users 110*a-b* may be realistic or unrealistic and/or may represent a current and/or prior appearance of the users. For example, a photorealistic representation of each of the users may be generated based on a combination of live images and prior images of the user. The prior images may be used to generate portions of the depictions 410*a-b* for which live image data is not available (e.g., portions of a user's face that are not in view of a camera or sensor of the electronic device 155 or that may be obscured, for example, by a headset or otherwise). In one example, the electronic devices 110*a-b* are head mounted devices (HMDs) and live image data of the users' faces includes downward facing camera images of the users' cheeks and mouth and inward facing camera images of the users' eyes, which may be combined with prior image data of the users' other portions of the users face, head, and torso that cannot be currently observed from the sensors of the devices. Prior data regarding a user's appearance may be obtained at an earlier time during the communication session, during a prior use of the electronic device, during an enrollment process used to obtain sensor data of the user's appearance from multiple perspectives and/or conditions, or otherwise.

In the example of FIGS. 1-4, the electronic devices 110*a-b* are illustrated as hand-held devices. The electronic devices 110*a-b* may be a mobile phone, a tablet, a laptop, so forth. In some implementations, electronic devices 110*a-b* may be worn by a user. For example, electronic devices 110*a-b* may be a watch, a head-mounted device (HMD), head-worn device (glasses), headphones, an ear mounted device, and so forth. In some implementations, functions of the devices 110*a-b* are accomplished via two or more devices, for example a mobile device and base station or a head mounted device and an ear mounted device. Various capabilities may be distributed amongst multiple devices, including, but not limited to power capabilities, CPU capabilities, GPU capabilities, storage capabilities, memory capabilities, visual content display capabilities, audio content production capabilities, and the like. The multiple devices that may be used to accomplish the functions of electronic devices 110*a-b* may communicate with one another via wired or wireless communications.

According to some implementations, the electronic devices 110*a-b* generate and present an extended reality (XR) environment that is shared by multiple users during a communication session.

Figure 5A:
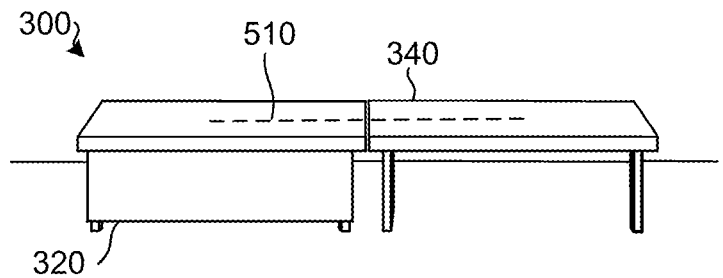
FIGS. 5A, 5B, and 5C illustrate exemplary relationships between the anchors in accordance with some implementations.
Figure 5B:
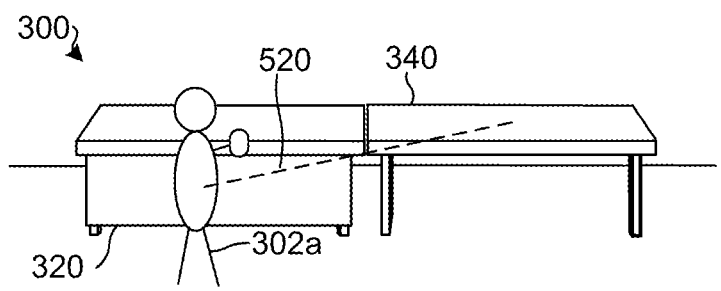
Figure 5C:
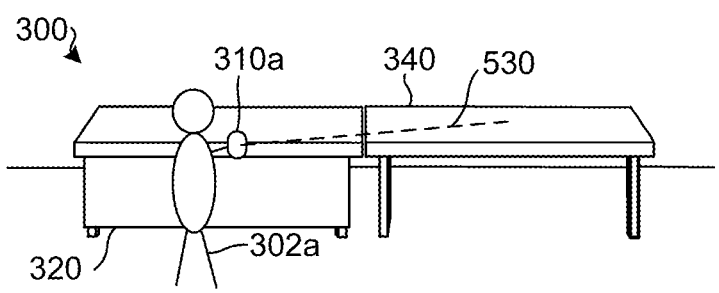

FIGS. 5A, 5B, and 5C illustrate exemplary relationships between the anchors of FIG. 3. In FIG. 5A, the distance 510 is a distance relationship between center points of two anchors—representation 320 of the first user's desk 120 and representation 340 of the second user's desk 140—within 3D environment 300. Sharing of content in a communication session between the users 102*a-b* may be based on this distance 510 satisfying a criterion, e.g., being less than a threshold distance. In one example, anchors for many users are positioned within a 3D environment 300 and the distances between those anchors are compared with a distance criterion to automatically initiate and/or continue the sharing of content. Thus, a given user may automatically share content with only those other users who have anchors (e.g., desk representations) within the threshold distance of the user's own anchor (e.g., desk representation).

In FIG. 5B, the distance 520 illustrates another exemplary distance relationship between two anchors—representation 302*a* of user 102*a* and representation 340 of the second user's desk 140—within the 3D environment 300. In this example, the representation 302*a* may be moved within the 3D environment, e.g., based on movement of or input by user 102*a*. For example, the 3D environment 300 may correspond to an XR environment in which user movements are provided. The sharing of content may be based on whether distance 520 satisfies a criterion at a given point in time. For example, during a first period of time the distance 520 may be greater than a distance threshold and thus limited or no sharing may occur. However, during another period of time after the user 102*a* has moved the avatar closer to the representation 340, content sharing may be initiated, increased, expanded or otherwise altered, until the distance 520 again exceeds the threshold distance. In some implementations, 3D environment 300 corresponds to portions of an XR environment that are always shared amongst users, and additional content is shared when a certain criterion is satisfied between user anchors. For example, the users may work within a shared XR environment including depictions of one another's empty desks all the time but only see and interact with other shared content such as the other user's representations/avatars or the other user's virtual content items when their anchors are within a threshold distance, e.g., 3 feet, 5 feet, 8 feet, 10 feet, etc. of one another.

In FIG. 5C, the distance 530 illustrates another exemplary distance relationship between two anchors—representation 310*a* of device 110*a* and representation 340 of the second user's desk 140—within the 3D environment 300. In this example, the representation 310*a* may be moved within the 3D environment, e.g., based on movement of device 110*a*. The sharing of content may be based on whether distance 530 satisfies a criterion at a given point in time. For example, during a first period of time the distance 530 may be greater than a distance threshold and thus limited or no sharing may occur. However, during another period of time after the representation 310*a* has been moved closer to the representation 340, content sharing be initiated, increased, expanded or otherwise altered, until the distance 530 again exceeds the threshold distance).

Figure 6A:
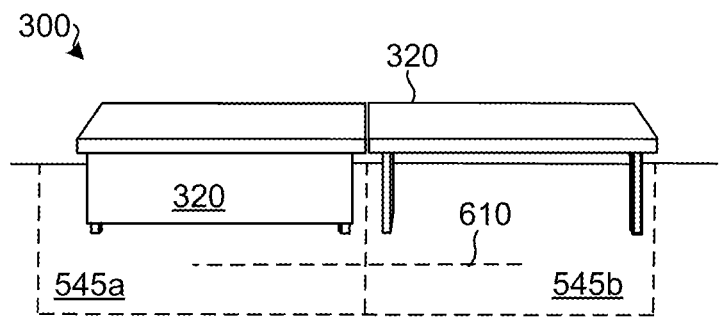
FIGS. 6A, 6B, and 6C illustrate additional exemplary relationships between the anchors in accordance with some implementations.
Figure 6B:
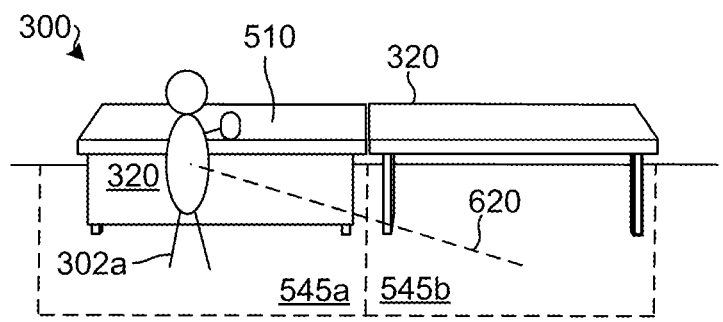
Figure 6C:
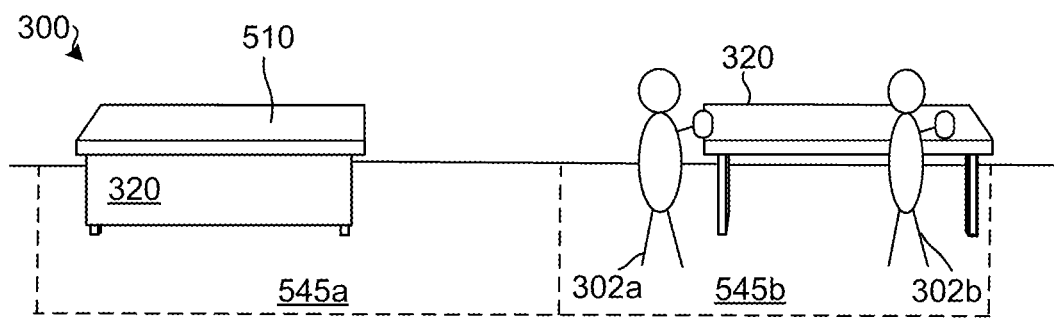

FIGS. 6A, 6B, and 6C illustrate additional exemplary relationships between anchors. In FIG. 6A, the distance 610 is a distance relationship between center points of two anchors—an area 545*a* defined within the 3D environment 300 for the first user 102*a* and an area 545*b* defined within the 3D environment 300 for the second user 102*b*. Sharing of content in a communication session between the users 102*a-b* may be based on this distance 610 satisfying a criterion, e.g., being less than a threshold distance. In one example, anchors for many users are defined as virtual cubicle spaces, virtual office spaces, or other bounded areas within the 3D environment 300 and the distances between those anchors are compared with a distance criterion to automatically initiate and/or continue the sharing of content. Thus, a given user may automatically share content with only those other users who have anchors (e.g., areas) within the threshold distance of the user's own anchor (e.g., area).

In some implementations, a user's area in 3D environment 300 corresponds to a portion of the user's physical environment, e.g., a particular room, office, cubicle, office, or defined area in the user's physical environment. In some implementations, a user's area is automatically determined or changed based on the user designating the inclusion of or positioning of content items within the 3D environment. For example, a user's area may expand to include additional areas at which the user places a virtual wall calendar, a couch, a meeting table and chairs, or any other real of virtual object. User areas may be positioned and repositioned within the 3D environment 300 over time, for example, to group users positionally together based on current collaboration expectations, e.g., based on which users are working together currently on one or more projects. In one example, within an organization, a managing user may periodically rearrange user areas or other anchors within a 3D environment based on current co-working expectations. In another example, positioning or grouping of user anchors within a 3D environment is based on each user's own input, e.g., identifying friends, co-workers, or others that the user wishes to be near for content sharing/interaction purposes.

In FIG. 6B, the distance 620 illustrates another exemplary distance relationship between two anchors—representation 302a of user 102a and area 545b of the 3D environment 300 associated with the second user 102b. In this example, the representation 302a may be moved within the 3D environment 300, e.g., based on movement of or input by user 102a. For example, the 3D environment 300 may correspond to an XR environment in which user movements are provided. The sharing of content may be based on whether distance 620 satisfies a criterion at a given point in time. For example, during a first period of time, the distance 620 may be greater than a distance threshold and thus limited or no sharing may occur. However, during another period of time, after the user 102a has moved the representation 302a closer to the area 545b, content sharing may be initiated, increased, expanded or otherwise altered, until the distance 620 again exceeds the threshold distance.

In FIG. 6C, the spatial relationship between anchors is the presence of representation 302a of the first user 102a within a boundary of the area 545b of the 3D environment 300 associated with the second user 102b. For example, this may occur when the first user 102a moves his or her representation 302a within the 3D environment 300 to visit the cubicle, office, or other space dedicated to the second user 102b, e.g., "walking" such that representation 302a is within the area 545b. The sharing of content may be based on whether a relationship satisfies a criterion at a given point in time, e.g., whether representation 302b is inside or outside of the boundaries of area 545b. For example, during a first period of time it may be outside and thus limited or no sharing may occur. However, during another period of time after the representation 302a has moved inside the boundary/region, content sharing be initiated, increased, expanded or otherwise altered, until the representation 302a is again moved outside the boundaries of area 545b.

In another example, sharing may additionally or alternatively be based on a criterion that the user who is assigned to/the owner of area 545b is present in their area 545b. For example, the sharing of content with user 102a may be based on whether representation 302a and 302b are both inside of the boundaries of area 545b at a given time.

Figure 7:
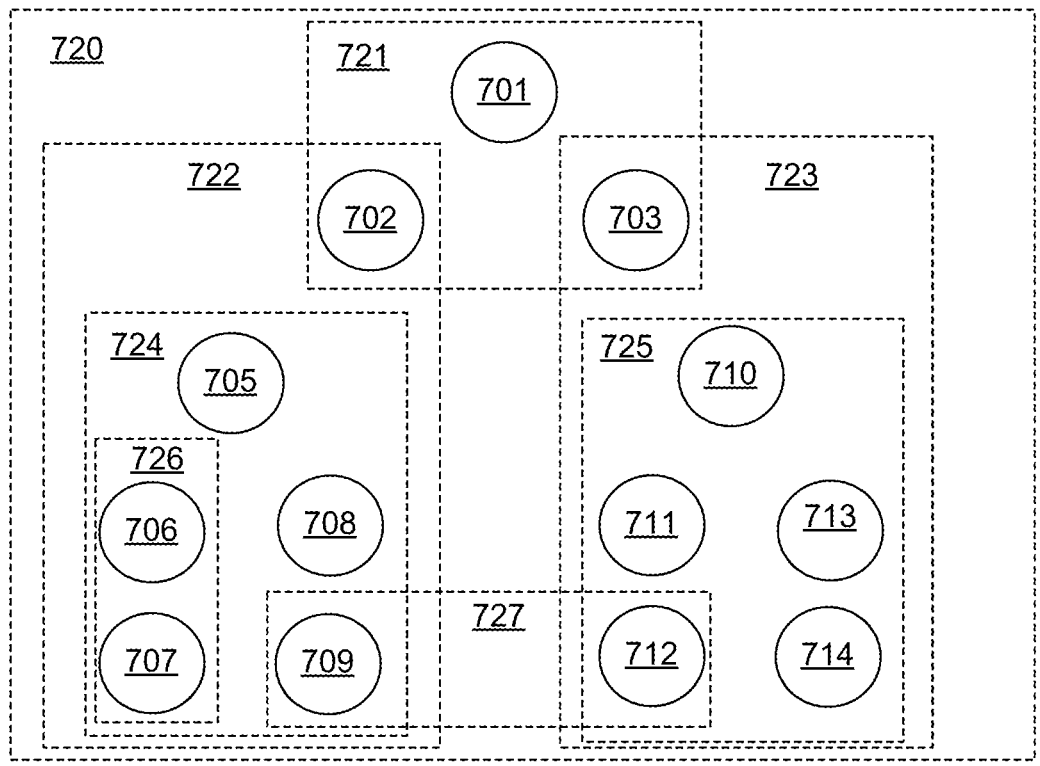
FIG. 7 illustrates exemplary clustering relationships between anchors in accordance with some implementations.

FIG. 7 illustrates exemplary clustering relationships between anchors. In this example, cluster 720 includes the anchors 701, 702, 703, 705, 706, 707, 708, 709, 710, 711, 712, 713, 714 associated with each user of a set of users. Subsets of the users are additionally grouped into additional clusters. Cluster 721 includes anchors 701, 702, 703. Cluster 722 includes anchors 702, 705, 706, 707, 708, 709. Cluster 723 includes anchors 703, 710, 711, 712, 713, 714. Cluster 724 includes anchors 705, 706, 707, 708, 709. Cluster 725 includes anchors 710, 711, 712, 713, 714. Cluster 726 includes anchors 706, 707. Cluster 727 includes anchors 709, 712. These exemplary clusters of anchors illustrate just a few of the numerous ways that anchors of two or more users may be grouped together for content sharing purposes.

The different clusters may be associated with content sharing or criterion for content sharing. For example, content sharing for cluster 720 may only occur if an all-user meeting is initiated and manually accepted by a given user in the cluster 720. Content sharing for cluster 724 may occur when an anchor of a user is within a threshold distance of an anchor of another user. Content sharing for each of cluster 726 and cluster 727 may occur automatically simply based on the users in each cluster being active in a common XR environment, e.g., any time the users are within a common XR environment on their respective devices, those users may share at least some content with one another, unless the users opt out or manually discontinue sharing.

These examples are provided merely to illustrate the numerous ways that content sharing amongst users can be organized, e.g., based on an organization chart, on one or more teams, determinations of who is likely to be collaborating or otherwise wishing to share content with one another. Implementations disclosed herein provide flexible means of implementing sharing according to one or more simple or complex sharing requirements amongst groups of any size. In one example, one user creates a cluster with sharing rules, criteria, attributes, etc. and invites other users to join that cluster. In another example, clustering is automatically determined based on spatial positioning of anchors, e.g., desks, user areas, etc., within a shared 3D environment, such as 3D environment 300 of FIGS. 3, 5A-C, and 6A-C.

Figure 8:
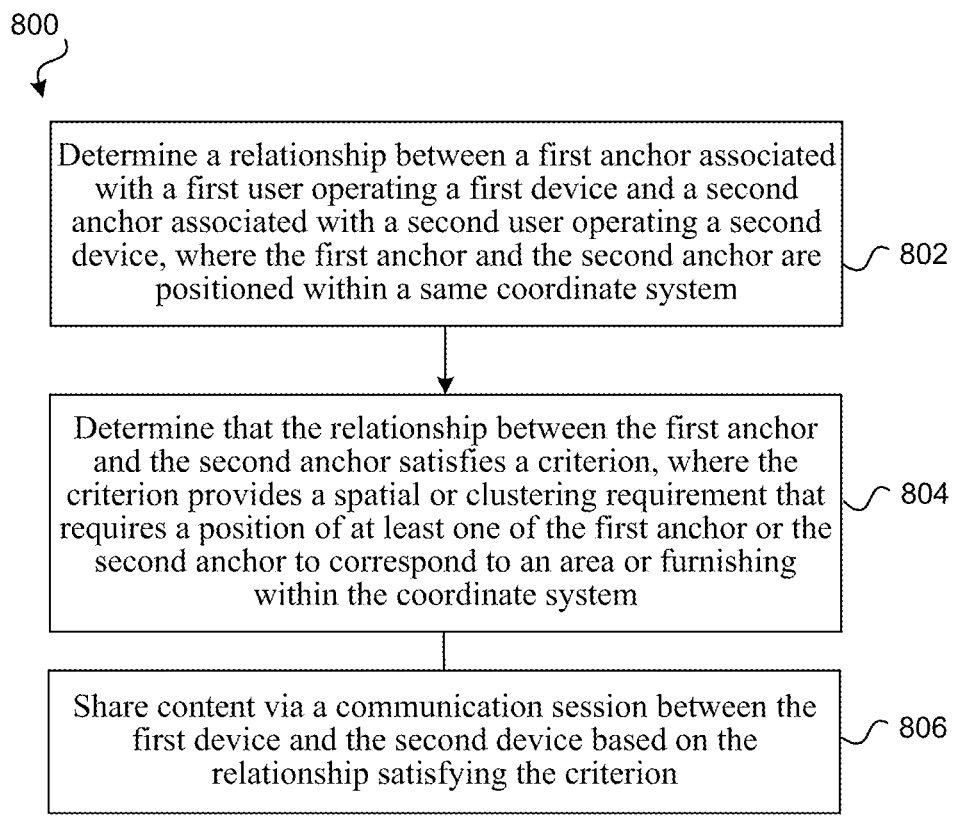
FIG. 8 is a flowchart illustrating a method for providing multi-user content sharing, in accordance with some implementations.

FIG. 8 is a flowchart illustrating a method 800 for multi-user content sharing. In some implementations, a device such as electronic device 110a or electronic device 110b, or a combination of the two, performs method 800. In some implementations, method 800 is performed on a mobile device, desktop, laptop, HMD, ear-mounted device or server device. The method 800 is performed by processing logic, including hardware, firmware, software, or a combination thereof. In some implementations, the method 800 is performed on a processor executing code stored in a non-transitory computer-readable medium (e.g., a memory).

At block 802, the method 800 determines a relationship between a first anchor associated with a first user operating a first device and a second anchor associated with a second user operating a second device, where the first anchor and the second anchor are positioned within a same coordinate system.

In some implementations, the coordinate system is an entirely virtual environment in which moving or stationary anchors are positioned and used to determined relationships that are used to share content amongst the users.

In some implementations, the coordinate system corresponds to or is otherwise based off of one or more real-world environments. For example, the coordinate system may correspond to an XR environment that is laid out generally based on a single real-world office space with real or virtual anchors that correspond to each user and that are used to determined relationships that are used to share content amongst the users. As a specific example, an anchor of one user may be that user's real-world desk as depicted at a position in an XR environment and an anchor of another user may be a virtual avatar of that other user. The relationship in this example may be the distance between that depiction of the desk and that avatar in the XR environment.

In another example, the coordinate system corresponds to an XR environment that is a combination of real-world spaces that are positioned differently relative to one another in the XR environment than in the real world. For example, depictions of the home offices of two users that are miles away from one another in the real world may be positioned adjacent to one another along a virtual hallway in an XR environment. As a specific example, an anchor of one user may be a boundary of that user's space as represented and positioned in the XR environment and another user's anchor may be that other user's avatar. The relationship in this example may be whether that other user's avatar is within the boundary of the first user's space in the XR environment.

In some implementations, the first user and second user are within the same physical environment and the anchors are positioned at positions defined relative to a coordinate system of that physical environment. The relationship thus may be a spatial distance in the coordinate system of the physical environment between a first anchor (e.g., the first user) and the second anchor (e.g., the second user's real desk).

In some implementations, the first user and second user are within separate physical environments and the anchors are positioned at positions defined relative to a common coordinate system defined based on an entirely virtual environment or another XR environment that may be based entirely or in part on one or both of the separate physical environments. The relationship may be a spatial distance in a virtual or XR environment between the first anchor and the second anchor.

In various examples, the anchors that are associated with users may be associated with various stationary or moving elements including, but not limited to, the users themselves (e.g., avatars or other representations of the users), the user's devices (e.g., handheld devices, desktop devices, etc.), the users' furnishings (e.g., their desks, white boards, tables, etc.), or the users' spaces (e.g., their offices, cubicles, etc.) within a space corresponding to the same coordinate system. In some implementations, the first anchor is the first user, the first device, a physical desk of the first user, a physical office space of the first user, a virtual avatar of the first user, a virtual desk of the first user, or a virtual office space of the first user and the second anchor is the second user, the second device, a physical desk of the second user, a physical office space of the second user, a virtual avatar of the second user, a virtual desk of the second user, or a virtual office space of the second user.

The relationship between anchors may be the distance between anchors within a coordinate system. Such distances may be based on center points, edge points, closest points, or any other portions of such anchors, e.g., based on the distance between anchor centers, the closest distance between anchor edges, etc.

The relationship between anchors may be whether the users' anchors are part of the same defined cluster, where the cluster is a predefined group of users or locations in which users can visit within a shared physical or a shared virtual environment. The relationship may be any of the relationships illustrated in FIGS. 5A-C, 6A-C, and 7.

The relationship between anchors may be a spatial relationship that is based on direct distance, distance between anchors without going through obstacles (e.g., walls), line-of-sight distance, whether the anchors are within sight of one another, or whether either anchor is separated (e.g., by being enclosed in a virtual office having its door closed), as examples.

At block 804, the method determines that the relationship between the first anchor and the second anchor satisfies a criterion, where the criterion provides a spatial or clustering requirement that requires a position of at least one of the first anchor or the second anchor to correspond to an area or furnishing within the coordinate system. For example, the criterion may require that the distance between a first user's anchor (e.g., the first user's avatar) and another user's anchor (e.g., the second user's desk) be less than a threshold distance apart. In another example, the criterion requires that the anchors of both users be associated with the same cluster. In another example, the criterion requires that the users' work space (e.g., bounded region) anchors be within a threshold distance of one another, etc. Examples of exemplary relationship criteria are also discussed herein with respect to FIGS. 5A-C, 6A-C, and 7.

At block 806, the method shares content via a communication session between the first device and the second device based on the relationship satisfying the criterion. For example, based on a first user's avatar anchor being close enough to the second user's desk anchor, the method 800 may initiate or continue to share content. The method 800 may automatically initiate the sharing of content, e.g., without requiring user action/input by one or more of the users involved. The method 800 may automatically share content by automatically initiating a communication session between the first device and the second device without requiring user action/input. The method 800 may automatically share content by sharing content via a new or established communication session without requiring user action/input. The shared content may be real or virtual content from the second user's desk, white board, table, UIs, etc. that is shared with the first user. In another example, the shared content may be audio captured on a microphone or video captured by a camera of each of the first and second devices that is shared with the other device.

The relationship satisfying the criterion may be used to (a) determine whether content is shared, (b) identify what content is shared, or (c) configure sharing attributes, e.g., increasing volume as anchors move closer to one another. In some implementations, the amount of shared content increases as additional criteria are satisfied. For example, more and more content may be shared as anchors get closer and closer together, e.g., as the distance between anchors satisfies additional threshold distance criteria. A first set of content may be shared based on the users' desk anchors being adjacent to one another and a second set of content may additionally be shared when one of the user's avatars moves within the other user's work area.

The content sharing may be further based on (a) user information, e.g., how loud a user is speaking or (b) user settings/restrictions, e.g., focus mode, do not disturb, share only certain items, share only based on manual confirmation. In one example, a user flags some content items for sharing and other content items to never be shared. In one example, only content items that a user expressly tags for sharing are shared so that other content items are not inadvertently shared. In another example, a user may identify some content items for sharing only in specific circumstances, e.g., share my audio to anyone with an anchor within 10 feet but only share my whiteboard if someone is within my office space. In another example, a use may specify a requirement that no sharing will occur until after the user has accepted a sharing request, e.g., the relationship may trigger a UI request asking the user if he or she would like to share content since another user's anchor is nearby.

In some implementations, multiple users experience their own portions of an XR environment for periods of time without sharing and/or interactions with one another and only share or interact in some circumstances. Each user, for example, may separately work for most of the day within his own virtual office in an XR environment that positions those virtual offices along a virtual hallway. At certain times, e.g., when one user visits the virtual office of another user, content sharing may be initiated to enable the users to interact with one another and/or share elements of their respective offices.

Users may indicate their receptiveness to such sharing/visiting at the current time so that they are only visited and potentially distracted from a current task/meeting/etc. at desirable times. As examples, sharing/visiting may not be enabled when a user closes his or her virtual office door, sharing/visiting may be allowed with manual confirmation/acceptance when a user leaves his or her office door cracked open, and sharing/visiting may be allowed without manual confirmation/acceptance when a user leaves his or her office door fully open. In another example, a user may specify certain times of day during which sharing/visiting with him or her is not allowed. In another example, a calendar of a user is inspected such that sharing/visiting with the user is only allowed during open calendar times. In another example, a user may initiate a focus mode or privacy mode to block all sharing/visiting while the user is in that mode.

Various indicators may be presented to other users so that those other users understand whether a given user is currently receptive to participation in content sharing, e.g., content sharing without manual confirmation. For example, a closed door of a user's office may indicate to other user's that that user is not receptive to sharing/visiting at the current time.

Figure 9:
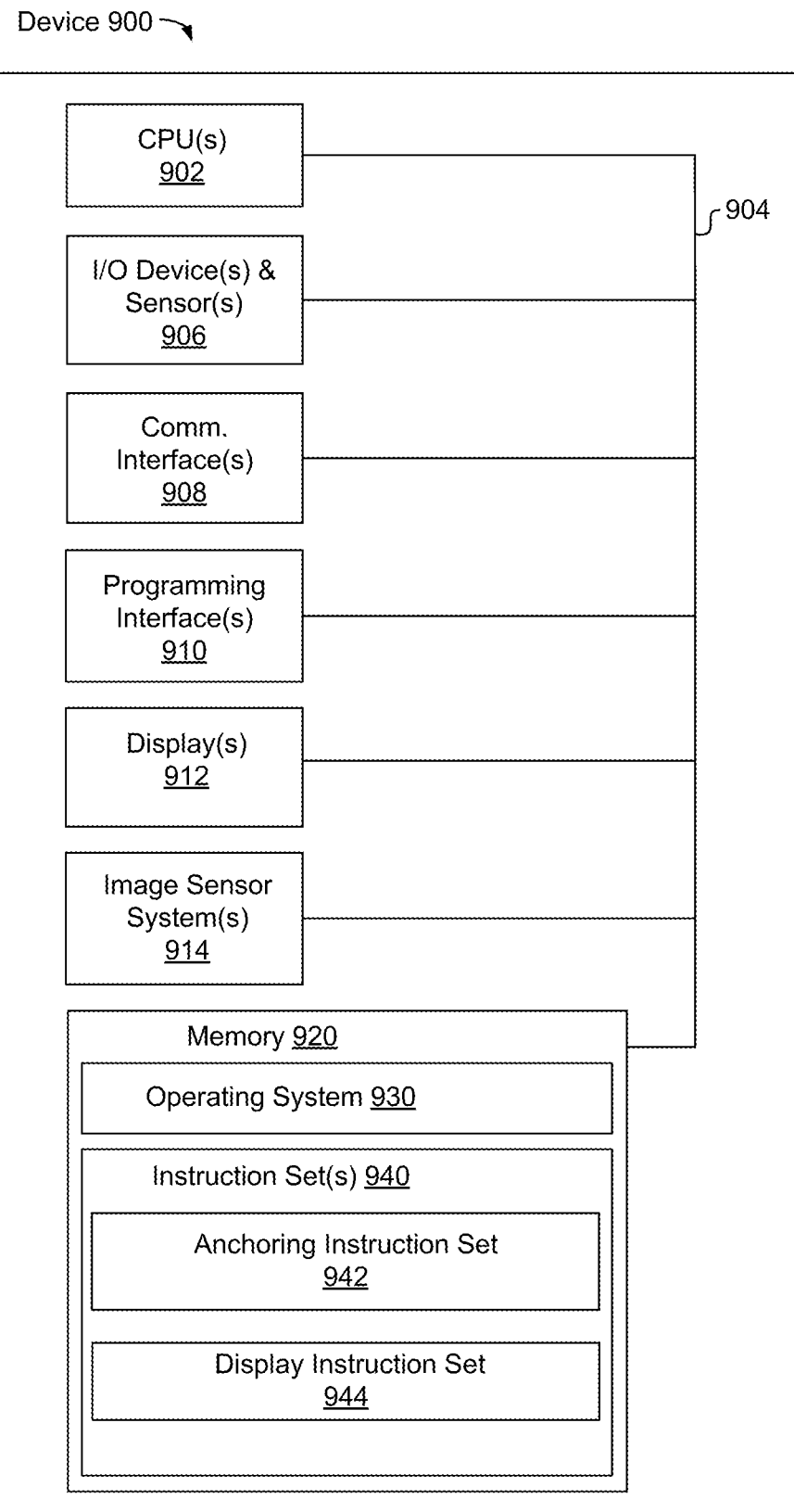
FIG. 9 is a block diagram of an electronic device of in accordance with some implementations.

FIG. 9 is a block diagram of electronic device 900. Device 900 illustrates an exemplary device configuration for electronic device 110*a* or electronic device 110*b*. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1200 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 910, one or more output device(s) 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device (s) 912 include one or more displays configured to present a view of a 3D environment to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 900 includes a single display. In another example, the device 900 includes a display for each eye of the user.

In some implementations, the one or more output device (s) 912 include one or more audio producing devices. In some implementations, the one or more output device(s) 912 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 912 may additionally or alternatively be configured to generate haptics.

In some implementations, the one or more image sensor systems 914 are configured to obtain image data that corresponds to at least a portion of a physical environment. For example, the one or more image sensor systems 914 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include an anchoring instruction set 942 configured to, upon execution, generate anchors and determine relationships amongst anchors as described herein. The instruction set(s) 940 further include a sharing instruction set 944 configured to, upon execution, determine to share content as described herein. The instruction set(s) 940 may be embodied as a single software executable or multiple software executables.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device having a processor:
     determining a relationship between a first anchor associated with a first user operating a first device and a second anchor associated with a second user operating a second device, wherein the first anchor and the second anchor are positioned within a same coordinate system, and wherein at least one of the first anchor or the second anchor corresponds to an area or furnishing within the coordinate system;
     determining that the relationship between the first anchor and the second anchor satisfies criterion, wherein the criterion comprises a spatial or clustering requirement; and
     automatically initiating a communication session involving sharing content between the first device and the second device based on the relationship satisfying the criterion and a user activity.

2. The method of claim 1, wherein:
   the first user and second user are within a same physical environment and the relationship comprises a spatial distance in the same physical environment between the first anchor and the second anchor; or
   wherein the first user and second user are within separate physical environments and the relationship comprises a spatial distance in a virtual environment between the first anchor and the second anchor.

3. The method of claim 1, wherein:
   a location of the first anchor corresponds to a location of the first user, the first device, a physical desk of the first user, a physical office space of the first user, a virtual avatar of the first user, a virtual desk of the first user, or a virtual office space of the first user; and
   a location of the second anchor corresponds to a location of the second user, the second device, a physical desk of the second user, a physical office space of the second user, a virtual avatar of the second user, a virtual desk of the second user, or a virtual office space of the second user.

4. The method of claim 1, wherein determining the relationship between the first anchor and the second anchor comprises determining whether the first user and second user are both within a same cluster, wherein the cluster is a predefined group of users or locations in which users can visit within a shared physical or a shared virtual environment.

5. The method of claim 1, wherein determining whether the relationship between the first anchor and the second anchor satisfies the criterion comprises:
   determining whether the first anchor is within a threshold distance of the second anchor; or determining whether the first anchor is within a region of the second anchor.

6. The method of claim 1, wherein sharing content comprises:
sharing virtual content defined for a virtual desk of the first user or the second user with the other of the first user or second user; or
sharing audio captured by a microphone or video captured by a camera of the first device or the second device with the other of the first device or second device.

7. The method of claim 1 further comprising, based on the relationship satisfying the criterion:
determining whether the content is to be shared;
identifying which content is to be shared; or
configuring an attribute of the content.

8. The method of claim 1, wherein the communication session involving sharing content between the first device and the second device is based on determining a volume level of speech of the user.

9. The method of claim 1, wherein the communication session involving sharing content between the first device and the second device is based on determining whether a do-not-disturb indicator is active for the user.

10. The method of claim 1, wherein the communication session involving sharing content between the first device and the second device is based on determining that the content item to be shared is of a particular type.

11. The method of claim 1, wherein the communication session involving sharing content between the first device and the second device is based on receiving a consent from the second user to initiate the communication session.

12. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
determining a relationship between a first anchor associated with a first user operating a first device and a second anchor associated with a second user operating a second device, wherein the first anchor and the second anchor are positioned within a same coordinate system, and wherein at least one of the first anchor or the second anchor corresponds to an area or furnishing within the coordinate system;
determining that the relationship between the first anchor and the second anchor satisfies criterion, wherein the criterion comprises a spatial or clustering requirement; and
automatically initiating a communication session involving sharing content between the first device and the second device based on the relationship satisfying the criterion and a user activity.

13. The system of claim 12, wherein:
the first user and second user are within a same physical environment and the relationship comprises a spatial distance in the same physical environment between the first anchor and the second anchor; or
wherein the first user and second user are within separate physical environments and the relationship comprises a spatial distance in a virtual environment between the first anchor and the second anchor.

14. The system of claim 12, wherein:
a location of the first anchor corresponds to a location of the first user, the first device, a physical desk of the first user, a physical office space of the first user, a virtual avatar of the first user, a virtual desk of the first user, or a virtual office space of the first user; and
a location of the second anchor corresponds to a location of the second user, the second device, a physical desk of the second user, a physical office space of the second user, a virtual avatar of the second user, a virtual desk of the second user, or a virtual office space of the second user.

15. The system of claim 12, wherein determining the relationship between the first anchor and the second anchor comprises determining whether the first user and second user are both within a same cluster, wherein the cluster is a predefined group of users or locations in which users can visit within a shared physical or a shared virtual environment.

16. The system of claim 12, wherein determining whether the relationship between the first anchor and the second anchor satisfies the criterion comprises:
determining whether the first anchor is within a threshold distance of the second anchor; or
determining whether the first anchor is within a region of the second anchor.

17. The system of claim 12, wherein sharing content comprises:
sharing virtual content defined for a virtual desk of the first user or the second user with the other of the first user or second user; or
sharing audio captured by a microphone or video captured by a camera of the first device or the second device with the other of the first device or second device.

18. The system of claim 12, wherein the operations further comprise, based on the relationship satisfying the criterion:
determining whether the content is to be shared;
identifying which content is to be shared; or
configuring an attribute of the content.

19. A non-transitory computer-readable storage medium storing program instructions executable via one or more processors to perform operations comprising:
determining a relationship between a first anchor associated with a first user operating a first device and a second anchor associated with a second user operating a second device, wherein the first anchor and the second anchor are positioned within a same coordinate system, and wherein at least one of the first anchor or the second anchor corresponds to an area or furnishing within the coordinate system;
determining that the relationship between the first anchor and the second anchor satisfies criterion, wherein the criterion comprises a spatial or clustering requirement; and
automatically initiating a communication session involving sharing content between the first device and the second device based on the relationship satisfying the criterion and a user activity.

20. The non-transitory computer-readable storage medium of claim 19, wherein:
the first user and second user are within a same physical environment and the relationship comprises a spatial distance in the same physical environment between the first anchor and the second anchor; or
wherein the first user and second user are within separate physical environments and the relationship comprises a spatial distance in a virtual environment between the first anchor and the second anchor.

21. The non-transitory computer-readable storage medium of claim 19, wherein:

a location of the first anchor corresponds to a location of the first user, the first device, a physical desk of the first user, a physical office space of the first user, a virtual avatar of the first user, a virtual desk of the first user, or a virtual office space of the first user; and a location of the second anchor corresponds to a location of the second user, the second device, a physical desk of the second user, a physical office space of the second user, a virtual avatar of the second user, a virtual desk of the second user, or a virtual office space of the second user.

22. The non-transitory computer-readable storage medium of claim 19, wherein determining the relationship between the first anchor and the second anchor comprises determining whether the first user and second user are both within a same cluster, wherein the cluster is a predefined group of users or locations in which users can visit within a shared physical or a shared virtual environment.

\* \* \* \* \*